Oct. 31, 1961     W. H. NEWELL ET AL     3,006,551
ANGLE FUNCTION COMPUTER
Filed June 15, 1948
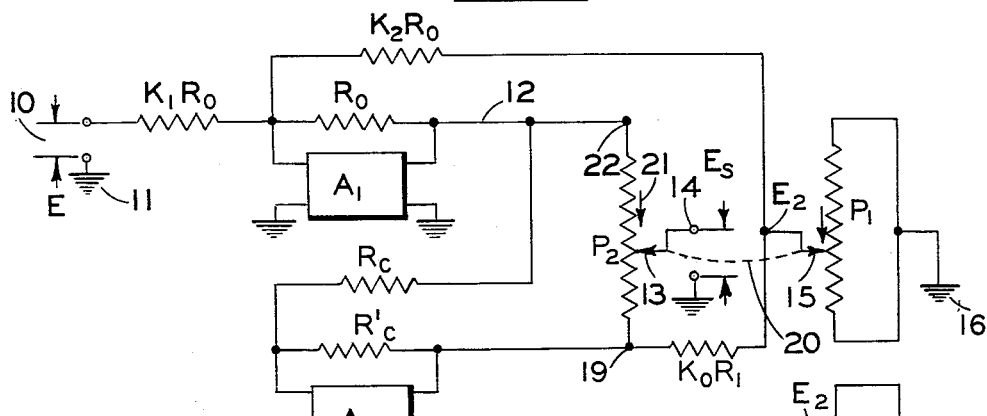
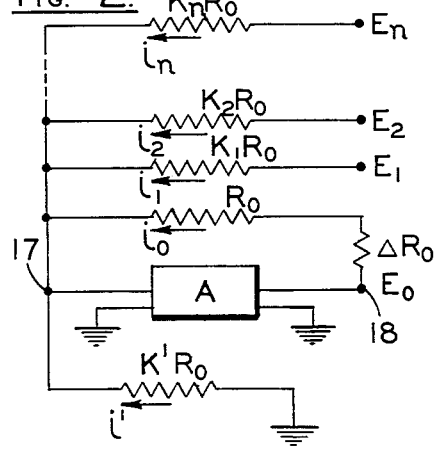
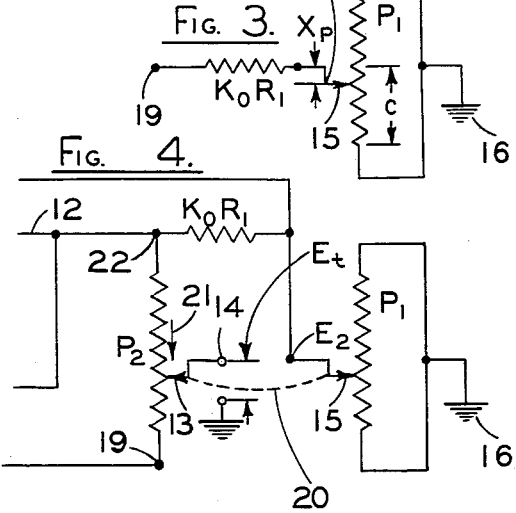
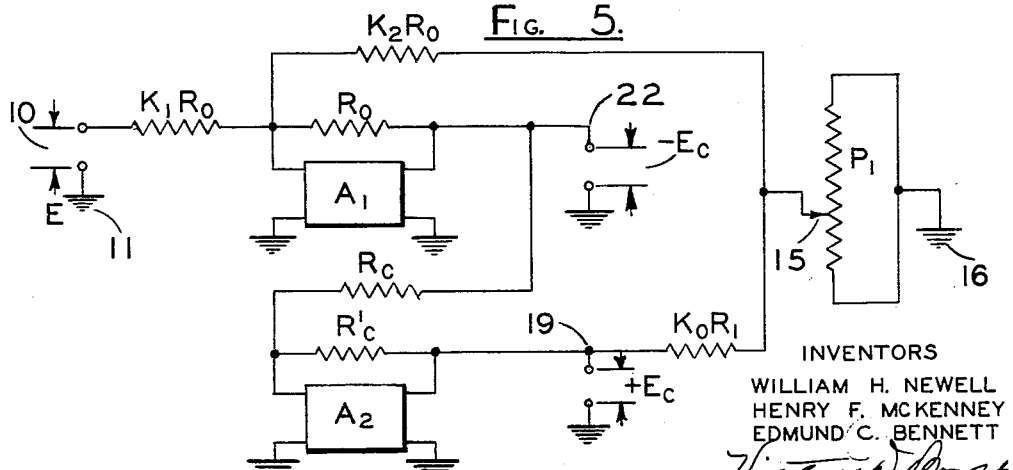
INVENTORS
WILLIAM H. NEWELL
HENRY F. MCKENNEY
EDMUND C. BENNETT
Victor N. Borst
ATTORNEY

3,006,551
ANGLE FUNCTION COMPUTER
William H. Newell, New York, Henry F. McKenney, Flushing, and Edmund C. Bennett, Great Neck, N.Y., assignors to Sperry Rand Corporation, a corporation of Delaware
Filed June 15, 1948, Ser. No. 33,186
5 Claims. (Cl. 235—186)

This invention relates to angle function computers and more particularly to a system for developing a voltage proportional to a function of an angle.

An object of the invention is to provide a system using linear resistors which may be accurately calibrated and are arranged to develop a voltage which is a function of the angle represented by linear movement along the resistor.

Another object is to provide a relatively simple and dependable system for the above purpose.

Another object is to provide a system of the above type which may be adapted to develop voltages proportional to the sine, cosine and tangent of the angle.

Various other objects and advantages will be apparent as the nature of the invention is more fully disclosed.

Although the novel features which are characteristic of this invention are set forth in detail in the claims, the nature of the invention will be better understood from the following description, taken in connection with the accompanying drawings in which a specific embodiment has been set forth for purposes of illustration.

In the drawings:

FIG. 1 is a schematic diagram illustrating a circuit embodying the present invention for developing sine function voltages;

FIGS. 2 and 3 are schematic diagrams used to explain the operations of FIG. 1;

FIG. 4 is a schematic diagram of a system for developing tangent function voltages, and FIG. 5 is a schematic diagram of a system for developing cosine function voltages.

The present invention is based upon a mathematical analysis of the functions involved and includes network elements arranged to represent the various terms in the equations of these functions.

Sin $x$ may be written:

$$\sin x = x - \frac{x^3}{6} + \frac{x^5}{120} - \frac{x^7}{5040} + \ldots \quad (1)$$

The function $$\frac{a}{b+x^2}$$

when expanded into infinite series, becomes:

$$\frac{a}{b+x^2} = \frac{a}{b} - \frac{ax^2}{b^2} + \frac{ax^4}{b^3} - \ldots \quad (2)$$

In a similar manner, the function $$\frac{dx^2}{b+x^2}$$

becomes:

$$\frac{dx^2}{b+x^2} = \frac{dx^2}{b} - \frac{dx^4}{b^2} + \frac{dx^6}{b^3} - \ldots \quad (3)$$

Subtracting Equation 3 from Equation 2:

$$\frac{a-dx^2}{b+x^2} = \frac{a}{b} - \frac{(a+bd)x^2}{b^2} + \frac{(a+bd)x^4}{b^3} - \ldots \quad (4)$$

Multiplying both sides of Equation 4 by $x$:

$$\frac{x(a-dx^2)}{b+x^2} = \frac{ax}{b} - \frac{(a+bd)x^3}{b^2} + \frac{(a+bd)x^5}{b^3} - \ldots \quad (5)$$

A comparison of this expression with that of sin $x$ in Equation 1 shows that with the exception of the coefficients of the powers of $x$, the two equations are identical.

The circuit to be described produces $$\frac{x(a-dx^2)}{b+x^2}$$

and by choosing the correct values for $a$, $b$ and $d$ and the various resistances in the circuit, a very close approximation of sine $x$ is obtained.

The circuit shown in FIG. 1 consists of three essential parts: the amplifiers $A_1$ and $A_2$ which may be of any standard type, the linear potentiometer $P_1$ with its associated resistor $K_0R_1$, and a linear potentiometer $P_2$ used to multiply the function $$\frac{a-dx^2}{b+x^2}$$

by $x$.

A fixed voltage E is applied from a source 10, one side of which is grounded at 11, through a resistor $K_1R_0$ to the input side of the linear amplifier $A_1$. The output side of the amplifier $A_1$ is connected back to the input through a resistor $R_0$, and through a line 12 to the linear potentiometer $P_2$ having a tap 13 connected to an output point 14, between which and ground the computed voltage $E_s$ is obtained.

The other end of the potentiometer $P_2$ is connected through the resistor $K_0R_1$ to the tap 15 of the potentiometer $P_1$, the ends of which are connected together and grounded at 16. The resistor $K_1R_0$ is also conected through a resistor $K_2R_0$ to the tap 15.

The output of the amplifier $A_1$ is connected through a resistor $R_c$ to the input of the second linear amplifier $A_2$. The input and output sides of the amplifier $A_2$ are connected together through a resistor $R'_c$ having a resistance equal to that of $R_c$, and the output of the amplifier $A_2$ is connected to the junction of the potentiometer $P_2$ and the resistor $K_0R_1$.

The explanation of the operation of this system may be simplified by considering the elements shown in FIG. 2 wherein a resistance $K'R_0$ represents the input impedance of the linear amplifier A, resistances $R_0$ and $\Delta R_0$ are connected between the input and output sides of the amplifier A, and resistances $K_1R_0$, $K_2R_0$ ... $K_nR_0$ are connected between the input of the amplifier A and points $E_1$, $E_2$ ... $E_n$, respectively.

Consider an amplifier A having an amplification factor $f$ and input impedance $K'R_0$. The input voltage at the point 17 is equal to the output voltage $E_0$ at the point 18, divided by the amplification factor $f$, and with the sign changed.

$$E = -\frac{E_0}{f} \quad (6)$$

The following series of equations describes the network of FIG. 2, wherein $i'$, $i_0$, $i_1$, $i_2$, ... $i_n$ represent the currents flowing through resistors $K'R_0$, $R_0$, $K_1R_0$, $K_2R_0$ ... $K_nR_0$ respectively:

$$i_0 = \frac{E_0}{R_0 + \Delta R_0} + \frac{E_0}{f(R_0 + \Delta R_0)}$$

$$= \frac{E_0}{R_0} + \frac{E_0}{fR_0} - \frac{E_0 \Delta R_0}{R_0(R_0 + \Delta R_0)} - \frac{E_0 \Delta R_0}{fR_0(R_0 + \Delta R_0)} \quad (7_0)$$

$$i' = \frac{E_0}{fK'R_0} \quad (7')$$

$$i_1 = \frac{E_1}{K_1 R_0} + \frac{E_0}{fK_1 R_0} \quad (7_1)$$

$$i_2 = \frac{E_2}{K_2 R_0} + \frac{E_0}{fK_2 R_0} \quad \ldots \quad (7_2)$$

$$i_n = \frac{E_n}{K_n R_0} + \frac{E_0}{fK_n R_0} \quad (7_n)$$

and $$i_0 + i' + i_1 + i_2 + \ldots i_n \quad (8)$$

Substituting Equations 7 in Equation 8:

$$\frac{1}{R_0}\left(E_0 + \frac{E_1}{K_1} + \ldots + \frac{E_n}{K_n}\right)$$
$$+ \frac{E_0}{fR_0}\left[\left(1 + \frac{1}{K'} + \frac{1}{K_1} + \ldots \frac{1}{K_n}\right) - \frac{\Delta R_0}{R_0 + \Delta R_0}(f+1)\right] = 0 \quad (9)$$

Let $$\frac{\Delta R_0(f+1)}{R_0 + \Delta R_0} = 1 + \frac{1}{K'} + \frac{1}{K_1} + \ldots + \frac{1}{K_n}$$

or $$\Delta R_0 = \frac{R_0\left(1 + \frac{1}{K'} + \frac{1}{K_1} + \ldots + \frac{1}{K_n}\right)}{f - \left(\frac{1}{K'} + \frac{1}{K_1} + \ldots + \frac{1}{K_n}\right)}$$

Substituting this value for $\Delta R_0$ in Equation 9 simplifies it to:

$$E_0 + \frac{E_1}{K_1} + \frac{E_2}{K_2} + \ldots + \frac{E_n}{K_n} = 0 \quad (10)$$

$\Delta R_0$ is known as the gain adjusting resistor and is not shown in FIGS. 1 and 4, as it is incorporated in the amplifier. It effectively makes the gain infinite and eliminates any effect of the input impedance on the output.

Referring now to FIG. 3, the potentiometer $P_1$ of resistance $R_1$ is shown with its ends connected together and grounded at the point 16 and with a resistor $K_0 R_1$ connected between its variable tap 15 and a point 19.

Referring to FIG. 3, the resistance $R_p$ between points 15 and 16 is given by the formula:

$$R_p = \frac{R_1(c^2 - x_p^2)}{4c^2} \quad (11)$$

where $R_1$ is the total resistance of the potentiometer $P_1$, $x_p$ is the distance of the sliding contact 15 from the center point of the potentiometer, and $c$ is the distance from the center point to either end terminal, i.e. the maximum value of $x_p$.

If a fixed resistor of resistance $K_0 R_1$ is connected between points 19 and 15, and a voltage $E_0$ connected across points 19 and 16, the voltage $E_2$ at point 15 will be given by the formula:

$$E_2 = E_0 \frac{\frac{R_1(c^2 - x_p^2)}{4c^2}}{\frac{R_1(c^2 - x_p^2)}{4c^2} + K_0 R_1} = \frac{E_0(c^2 - x_p^2)}{(4K_0 + 1)c^2 - x_p^2} \quad (12)$$

Referring again to FIG. 1, which shows the circuit for the sin $x$ computer, the amplifiers $A_1$ and $A_2$ are of the high gain type, the linear potentiometers $P_1$ and $P_2$ are geared together at 20 and both displaced from center by the distance $x_p$ which represents the angle in radians the sine of which is to be computed. Positive and increasing direction of $x_p$ is indicated by an arrow 21, on the potentiometer $P_2$.

If the voltage at point 19 is called $+E_0$, then Equation 10 applied to the amplifier $A_2$ and the resistors $R_c$ and $R'_c$ gives the voltage at the point 22 as $-E_0$.

Using Equation 10 again for the amplifier $A_1$, with the associated resistors $R_0$, $K_1 R_0$ and $K_2 R_0$, and with $E_1$ of FIG. 2 equal to E of FIG. 1:

$$-E_0 + \frac{E}{K_1} + \frac{E_2}{K_2} = -E_0 + \frac{E}{K_1} + \frac{E_0(c^2 - x_p^2)}{K_2(4K_0 c^2 + c^2 - x_p^2)} = 0 \quad (13)$$

where E is the input voltage. Simplifying Equation 13:

$$E_0 - \frac{E_0(c^2 - x_p^2)}{K_2(4K_0 c^2 + c^2 - x_p^2)} = \frac{E}{K_1}$$

or $$\frac{E_0}{E} = \frac{\frac{(4K_0+1)K_2 c^2}{K_1(1-K_2)} - \frac{K_2 x_p^2}{K_1(1-K_2)}}{c^2\left(\frac{4K_0 K_2}{1-K_2} - 1\right) + x_p^2} \quad (14)$$

The voltage at the point 19 on the potentiometer $P_2$ is $+E_0$ while the voltage at the point 22 on the other end of the potentiometer is $-E_0$. Therefore the voltage $E_s$ at the point 13 is equal to $$x_p E_0$$

where $x_p$ and $c$ have the same meanings as in the case of the potentiometer $P_1$ of FIG. 3.

$$\frac{E_s}{E} = x_p \frac{\frac{cK_2(4K_0+1)}{K_1(1-K_2)} - \frac{K_2 x_p^2}{cK_1(1-K_2)}}{\frac{4K_0 K_2 c^2}{1-K_2} - c^2 + x_p^2} \quad (15)$$

Comparing this with Equation 5:

$$\frac{cK_2(4K_0+1)}{K_1(1-K_2)} \quad \text{corresponds to } a \quad (16)$$

$$\frac{K_2}{cK_1(1-K_2)} \quad \text{corresponds to } d \quad (17)$$

and $$\frac{4K_0 K_2 c^2}{1-K_2} - c^2 \quad \text{corresponds to } b \quad (18)$$

With proper values given to the parameters $K_0$, $K_1$ and $K_2$, the output voltage $E_s$ will closely approximate E multiplied by sin $x$.

The calculation of the parameters $K_0$, $K_1$ and $K_2$ is carried out by first determining the range over which the function is to be computed. This, for example, may be from $$-\frac{\pi}{2} \text{ to } +\frac{\pi}{2}$$

radians, or if only small angles are to be considered, from $$-\frac{\pi}{6} \text{ to } +\frac{\pi}{6}$$

radians. Next three arbitrary values of $x$, such as $x_1$, $x_2$ and $x_3$, are chosen in that range. For these values of $x$ the error in the final result will be zero, but between them there will be a slight error at all points, the greater the range between two adjacent values, the greater the maximum error in that range.

The value of $c$ is not critical but should be slightly greater than the maximum value of $x$, depending on the construction of the potentiometers.

From Equation 17, $$K_1 = \left|\frac{K_2}{cd(1-K_2)}\right| \quad (19)$$

From Equations 16 and 19, $$K_0 = \left|\frac{a - dc^2}{4dc^2}\right| \quad (20)$$

From Equations 18 and 20, $$K_2 = \left|\frac{bd + c^2 d}{bd + a}\right| \quad (21)$$

The values of $K_1$, $K_0$ and $K_2$ can be calculated from Equations 19, 20 and 21, using the assigned values of $c$, $x_1$, $x_2$ and $x_3$, and the values of $a$, $b$ and $d$ obtained from the following:

$$b = -\frac{y_1 x_1^2 (x_3^2 - x_2^2) + y_2 x_2^2 (x_1^2 - x_3^2) + y_3 x_3^2 (x_2^2 - x_1^2)}{y_1 (x_3^2 - x_2^2) + y_2 (x_1^2 - x_3^2) + y_3 (x_2^2 - x_1^2)} \quad (22)$$

$$d = \frac{b(y_1 - y_2) + x_1^2 y_1 - x_2^2 y_2}{x_2^2 - x_1^2} \quad (23)$$

$$a = x_1^2 y_1 + d x_1^2 + y_1 b \quad (24)$$

For the sine function, $$y_1 = \frac{\sin x_1}{x_1};\ y_2 = \frac{\sin x_2}{x_2};\ y_3 = \frac{\sin x_3}{x_3} \quad (25)$$

For the tangent function, $$y_1 = \frac{\tan x_1}{x_1};\ y_2 = \frac{\tan x_2}{x_2};\ y_3 = \frac{\tan x_3}{x_3} \quad (26)$$

For the cosine function $$y_1 = \cos x_1;\ y_2 = \cos x_2;\ y_3 = \cos x_3 \quad (27)$$

As indicated in Equations 19, 20 and 21, the absolute values of $K_1$, $K_0$ and $K_2$ are used, their effect being positive or negative depending on the type of circuit.

The values of $R_0$, $R_c$ and $R'_c$ should be high, for example, one megohm. With the values of the parameters $K_1$ and $K_2$ determined from the above formulae, the values of the resistances $K_1 R_0$ and $K_2 R_0$ can be calculated in ohms. The value of $R_1$ depends upon the type of potentiometer used and is not critical, but must be large enough to prevent overloading the amplifiers. Knowing the value of $R_1$, $K_0 R_1$ can be determined as soon as the value of $K_0$ is found. The resistance $R_2$ of the potentiometer $P_2$ must also be large enough to prevent overloading the amplifier.

A typical calculation of the values of $K_0$, $K_1$ and $K_2$ for the sine function of $x$ between 0.0 and $$\frac{\pi}{2}$$

radians follows:

Assume $x_1 = 0.6$; $x_2 = 1.2$ and $x_3 = 1.5$ radians, then, from Equations 22 and 25:

$$b = -\frac{\frac{\sin 0.6}{0.6}(0.6)^2\{(1.5)^2 - (1.2)^2\} + \frac{\sin 1.2}{1.2}(1.2)^2\{(0.6)^2 - (1.5)^2\} + \frac{\sin 1.5}{1.5}(1.5)^2\{(1.2)^2 - (0.6)^2\}}{\frac{\sin 0.6}{0.6}\{(1.5)^2 - (1.2)^2\} + \frac{\sin 1.2}{1.2}\{(0.6)^2 - (1.5)^2\} + \frac{\sin 1.5}{1.5}\{(1.2)^2 - (0.6)^2\}} \quad (28)$$

$= 17.877389$

From Equations 23, 25 and 28

$$d = \frac{17.877389\left(\frac{\sin 0.6}{0.6} - \frac{\sin 1.2}{1.2}\right) + (0.6)^2\left(\frac{\sin 0.6}{0.6}\right) - (1.2)^2\left(\frac{\sin 1.2}{1.2}\right)}{(1.2)^2 - (0.6)^2} \quad (29)$$

$= 1.9989567$

From Equations 24, 25, 28 and 29:

$$a = (0.6)^2\left(\frac{\sin 0.6}{0.6}\right) + 1.9989567(0.6)^2 + 17.877389\left(\frac{\sin 0.6}{0.6}\right)$$

$= 17.882299 \quad (30)$

Let $c = 1.6$, then from Equation 20, with $$\frac{a}{d} = \frac{17.882299}{1.9989567} = 8.9458161$$

$$K_0 = \left|\frac{8.9458161}{4(1.6)^2} - 1\right| = 0.62361485 \quad (31)$$

From Equation 21:

$$K_2 = \left|\frac{17.877389 + (1.6)^2}{17.877389 + 8.9458161}\right| = 0.76192942 \quad (32)$$

From Equation 19:

$$K_1 = \left|\frac{0.76192942}{1.9989567(1.6)(1 - 0.7192942)}\right| = 0.99946489 \quad (33)$$

With $R_0 = 1{,}000{,}000$ ohms, and $R_1 = 10{,}000$ ohms, and the above values of $K_0$, $K_1$ and $K_2$:

$K_1 R_0 = 999{,}465$ ohms
$K_2 R_0 = 761{,}929$ ohms
$K_0 R_1 = 6{,}236.15$ ohms From Equation 5 and the values of $a$, $b$ and $d$ obtained above:

$$f(x) = \frac{1.9989567 \times (8.9458161 - x^2)}{17.877389 + x^2} = \frac{E_s}{E} \quad (34)$$

This function very closely approximates $\sin x$, being accurate at $x = 0.6$, 1.2 and 1.5 radians, and with a maximum error within this range of $-0.000081$ when $x = 0.94$ radian. By assuming other values for $x_1$, $x_2$ and $x_3$, the maximum error may be reduced below this amount if greater accuracy is desired.

For calculation of the values of $\tan x$, the circuit of FIG. 1 is modified by removing the resistor $K_0 R_1$ from between the points 15 and 19 and connecting it between the points 15 and 22, as shown in FIG. 4.

The tangent function may be written:

$$\tan x = x + \frac{x^3}{3} + \frac{2x^5}{15} + \ldots \quad (35)$$

Slightly modifying Equation 5:

$$\frac{x(a - dx^2)}{b - x^2} = \frac{ax}{b} + \frac{a - bd}{b^2}x^3 + \frac{a - bd}{b^3}x^5 + \ldots \quad (36)$$

If in Equation 15 the terms $$\frac{cK_2(4K_0 + 1)}{K_1(1 - K_2)};\ \frac{K_2}{cK_1(1 - K_2)}\ \text{and}\ \frac{4K_0 K_2 c^2}{1 - K_2} - c^2$$

are all negative, the output voltage $E_t$ corresponds to the function of Equation 36 and will closely approximate $E$ multiplied by $\tan x$.

For values of $x$ ranging from $-1.0$ to $+1.0$ radian, and assuming $x_1 = 0.4$, $x_2 = 0.7$ and $x_3 = 1.0$ radian, Equations 19, 20, 21, 22, 23, 24 and 26 give the following:

$b = 2.4830037$, $d = 0.1734918$, $a = -2.4831337$, and with $c = 1.1$, $K_0 = 2.707167$, $K_1 = 4.628125$ and $K_2 = 0.1076110$.

With $R_0 = 1{,}000{,}000$ ohms, and $R_1 = 10{,}000$ ohms:

$K_1 R_0 = 462{,}813$ ohms
$K_2 R_0 = 107{,}611$ ohms
$K_0 R_1 = 27{,}071.67$ ohms $$f(x) = 0.1734918 \times \frac{14.312686 - x^2}{2.4831337 - x^2} = \frac{E_t}{E} \quad (37)$$

This function very closely approximates tan $x$, being accurate at $x=0.4$, 0.7 and 1.0 radian, and with a maximum error within this range of .000068 when $x=0.95$ radian. As in the case of sin $x$, by assuming other values for $x_1$, $x_2$ and $x_3$, the maximum error may be reduced below this amount if greater accuracy is desired.

For calculation of the values of cos $x$, the circuit of FIG. 1 is modified by the removal of the potentiometer $P_2$ as shown in FIG. 5.

The cosine function may be written:

$$\cos x = 1 - \frac{x^2}{2} + \frac{x^4}{24} - \frac{x^6}{720} + \ldots \qquad (38)$$

This is similar to the series of the function $$\frac{a - dx^2}{b + x^2}$$

given in Equation 4 and this function in turn is similar to the function $$\frac{E_0}{E}$$

given in Equation 14. Therefore, to obtain the function cos $x$, it is only necessary to eliminate the potentiometer $P_2$ and by proper choice of values for $x_1$, $x_2$ and $x_3$, obtain satisfactory values for $K_0$, $K_1$ and $K_2$.

The voltage $E_c$ at the point 19 will very closely approximate $E \cos x$, while that at the point 22 will approximate $E(-\cos x)$.

For values of $x$ ranging from $-1.0$ to $+1.0$ radian, and assuming $x_1=0.1$, $x_2=0.6$ and $x_3=1.0$, Equations 19, 20, 21, 22, 23, 24 and 27 give the following:

$b=11.179794$, $d=4.5991124$, $a=11.179883$, and with $c=1.1$, $K_0=0.2522476$, $K_1=2.005972$ and $K_2=0.9102999$.

With $R_2=1{,}000{,}000$ ohms, and $R_1=10{,}000$ ohms:

$K_1R_0=2{,}005{,}972$ ohms
$K_2R_0=910{,}300$ ohms
$K_0R_1=2{,}522.48$ ohms $$f(x) = 4.5991124 \frac{2.409135 - x^2}{11.179794 + x^2} = \frac{E_c}{E} \qquad (39)$$

This function very closely approximates cos $x$, being accurate at $x=0.1$, 0.6 and 1.0 radian, and with a maximum error within this range of 0.00014 when $x=0.86$ radian. Again as in the case of sin $x$, by assuming other values for $x_1$, $x_2$ and $x_3$, the maximum error may be reduced below this amount if greater accuracy is required.

Although specific embodiments have been shown for purposes of illustration it is to be understood that the networks may be varied provided they are connected to produce voltages according to the formulas set forth in Equations 5 for the sine functions, 36 for the tangent functions, and 4 for the cosine functions.

What is claimed is:

1. An electrical computer system comprising a linear amplifier, a resistor connected in the input circuit of said amplifier, a source of fixed voltage connected in series between said resistor and ground, a second resistor connected between the input and output ends of said amplifier, said output end being connected to one end of a linear potentiometer having a variable tap, the other end of said potentiometer being connected through a third resistor to the variable tap of a second potentiometer having its ends grounded, said taps being displaceable in unison from their mid-positions by amounts representing the angle whose sine is to be obtained, said input end being connected through a fourth resistor to said last variable tap, said output end being connected through a fifth resistor to the input of a second linear amplifier, a sixth resistor connected between the input and output ends of said second amplifier, the output end of said second amplifier being connected to the junction of the first potentiometer and the third resistor, said resistors having a relationship to produce an output voltage between the tap of said first potentiometer and ground approximately proportional to the sine of the angle represented by the displacement of said taps from their mid-positions.

2. An electrical computer system comprising a linear amplifier, a resistor connected in the input circuit of said amplifier, a source of fixed voltage connected in series between said resistor and ground, a second resistor connected between the input and output ends of said amplifier, said output end being connected through a third resistor to the input end of a second linear amplifier, a fourth resistor connected between the input and output ends of said second amplifier, the input end of said first amplifier being connected through a fifth resistor to the variable tap of a potentiometer having its ends grounded, the output end of said second amplifier being connected through a sixth resistor to said tap, said resistors having a relationship to produce output voltages between the output ends of said two amplifiers and ground approximately proportional to the positive and negative values respectively of the cosine of the angle represented by the displacement of said tap from its mid-position.

3. An electrical computer system comprising a linear amplifier, a resistor connected in the input circuit of said amplifier, a source of fixed voltage connected in series between said resistor and ground, a second resistor connected between the input and output ends of said amplifier, said output end being connected to one end of a linear potentiometer having a variable tap, and through a third resistor to the variable tap of a second potentiometer having its ends grounded, said taps being displaceable in unison from their mid-positions by amounts representing the angle whose tangent is to be obtained, said input end being connected through a fourth resistor to said last variable tap, said output end being connected through a fifth resistor to the input of a second linear amplifier, a sixth resistor connected between the input and output ends of said second amplifier, the output end of said second amplifier being connected to the second end of said first potentiometer, said resistors having a relationship to produce an output voltage between the tap of the first potentiometer and ground approximately proportional to the tangent of the angle represented by the displacement of said taps from their mid-positions.

4. An electrical computer system comprising a linear amplifier system, a source of fixed voltage connected to the input of said amplifier, the output end of said amplifier being connected to a linear potentiometer having a variable tap, one end of said potentiometer being connected through a resistor to the variable tap of a second potentiometer having its ends grounded, said taps being displaceable in unison from their mid-positions by amounts representing the angle whose function is to be obtained, the input of said amplifier being connected through a second resistor to said last variable tap, the output end of said amplifier being connected through a third resistor to the input of a second linear amplifier, the output end of said second amplifier being connected to the junction of the first potentiometer and the first resistor, said resistors having a relationship to produce an output voltage between the tap of said first potentiometer and ground approximately proportional to a function of the angle represented by the displacement of said taps from their mid-positions.

5. An electrical computer system comprising a linear amplifier, the output end of said amplifier being connected through a resistor to the input end of a second linear amplifier, the input end of said first amplifier being connected through a resistor to the variable tap of a potentiometer having its ends grounded, the output end of said second amplifier being connected to said tap, said resistors having a relationship to produce output voltages between the output ends of said two amplifiers and ground approximately proportional to the positive and negative values respectively of the angle represented by the displacements of said tap from its mid-position.

References Cited in the file of this patent

UNITED STATES PATENTS

| | | |
|---|---|---|
| 2,382,994 | Holden | Aug. 21, 1945 |
| 2,385,334 | Davey | Sept. 25, 1945 |
| 2,401,779 | Swartzel | June 11, 1946 |